(12) United States Patent
Abler

(10) Patent No.: US 6,379,734 B1
(45) Date of Patent: Apr. 30, 2002

(54) AUTOMATED BRINE SYSTEM FOR COOLING CHEESE

(75) Inventor: Joseph H. Abler, Brookfield, WI (US)

(73) Assignee: Stainless Steel Fabricating Inc., Columbus, WI (US)

( * ) Notice: Subject to any disclaimer, the term of this patent is extended or adjusted under 35 U.S.C. 154(b) by 0 days.

(21) Appl. No.: 09/533,717

(22) Filed: Mar. 23, 2000

Related U.S. Application Data

(60) Provisional application No. 60/184,795, filed on Feb. 24, 2000.

(51) Int. Cl.[7] ............................................. A23C 19/14
(52) U.S. Cl. .................. 426/524; 426/582; 99/455; 99/535; 62/64; 62/374; 62/375; 62/381
(58) Field of Search .................... 99/455, 535, 452, 99/534, 453, 517; 426/524, 582, 506; 62/64, 381, 374, 375

(56) References Cited

U.S. PATENT DOCUMENTS

| | | | | |
|---|---|---|---|---|
| 1,339,212 A | * | 5/1920 | Mackenrot | .................... 99/535 |
| 1,924,271 A | * | 8/1933 | Chapman | |
| 1,940,192 A | * | 12/1933 | Sorber | |
| 2,196,643 A | * | 4/1940 | Reeh | |
| 2,638,759 A | * | 5/1953 | Barris | |
| 3,405,455 A | * | 10/1968 | Strong | |
| 3,482,508 A | * | 12/1969 | Bajcar et al. | ................... 99/535 |
| 3,779,034 A | * | 12/1973 | Morgan | ....................... 62/381 |
| 3,824,918 A | * | 7/1974 | Bronkhorst | ................... 99/452 |
| 3,910,174 A | * | 10/1975 | Nelles | ........................ 99/452 |
| 4,068,014 A | * | 1/1978 | Heimbruch | ................. 426/582 |
| 4,108,056 A | * | 8/1978 | Van Elten et al. | ............. 99/452 |
| 4,815,368 A | | 3/1989 | Nelles | ........................ 99/452 |
| 4,820,540 A | * | 4/1989 | Budahn | ...................... 426/582 |
| 4,869,161 A | * | 9/1989 | LaCount | ..................... 99/455 |
| 4,902,523 A | * | 2/1990 | Fritchen et al. | ............. 426/231 |
| 5,018,440 A | * | 5/1991 | Johnson | ....................... 99/535 |
| 5,195,426 A | * | 3/1993 | Thuli | ......................... 99/452 |
| 5,881,639 A | * | 3/1999 | Nesheim et al. | ............. 99/455 |

FOREIGN PATENT DOCUMENTS

EP          0009279 A1 * 2/1980 .......... B65G/49/00

* cited by examiner

Primary Examiner—Milton I. Cano
Assistant Examiner—Robert Madsen
(74) Attorney, Agent, or Firm—George E. Haas; Quarles & Brady LLP

(57) ABSTRACT

An apparatus has a brine tank that is subdivided into cooling cells each having a vertical carousel for submerging blocks of cheese. The cheese blocks are carried through an inlet flume by a flow of brine and then sequentially diverted into the cooling cells where the cheese blocks are loaded into the respective vertical carousel. After the cheese has cooled sufficiently, the brine flow carries the blocks of cheese out of the respective cooling cell. Movement of the cheese blocks and the carousels is controlled automatically, without human intervention. A unique fluid circulation system transfers chilled brine through the tank from a cooling cell containing the coldest cheese to cooling cells with successively warmer cheese blocks.

36 Claims, 4 Drawing Sheets

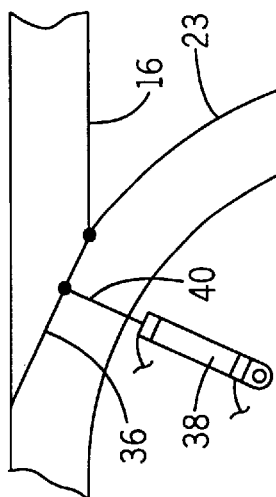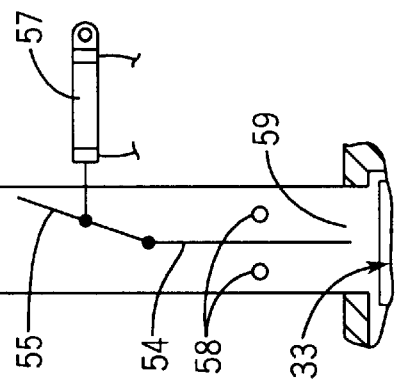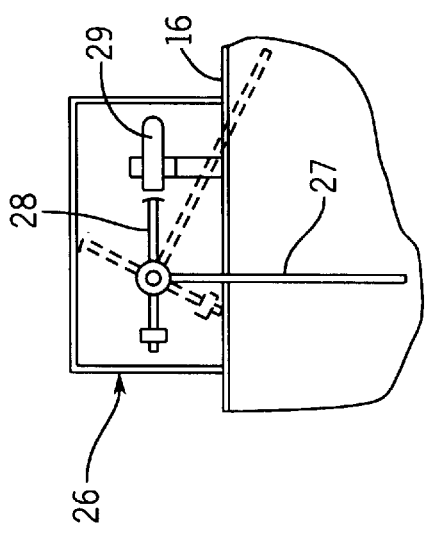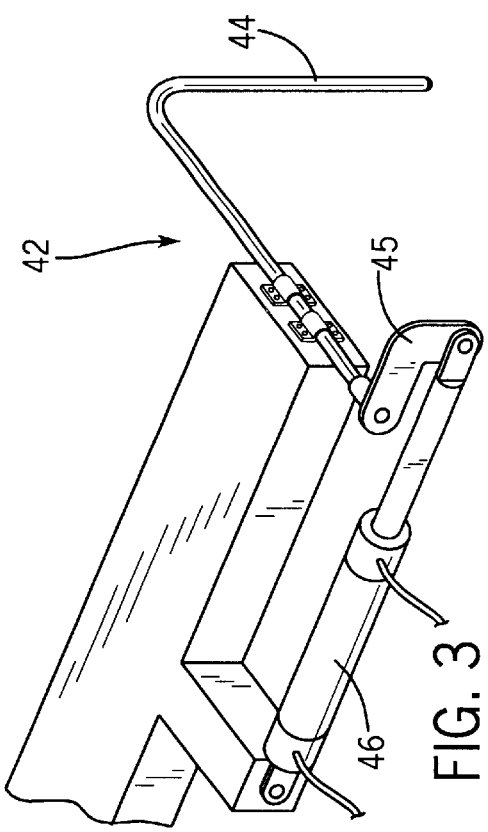

AUTOMATED BRINE SYSTEM FOR COOLING CHEESE

This application claims benefit of U.S. Provisional Patent Application No. 60/184,795 filed Feb. 24, 2000.

BACKGROUND OF THE INVENTION

The present invention relates to equipment for producing cheese, such as mozzarella; and more particularly to equipment for cooling and salting newly formed blocks of cheese.

Mozzarella cheese is commonly produced in five to twenty pound blocks or cylinders which are molded at a typical temperature of 135 degrees Fahrenheit. At this temperature the cheese block is very soft and can be miss-shapened if not handled with care. Thus, before the cheese can be packaged, the blocks have to be cooled to approximately fifty degrees Fahrenheit. In addition, salt has to be added to the cheese if it was not already added prior to the molding step. The finished product has from one to two percent salt by weight.

There are two processes presently being employed to cool the cheese and add salt after molding. In the first method, cheese emerging from the molding equipment drops into a serpentine open channel, or flume, through which a brine flows. Cheese floats in a saturated brine, but sinks in fresh water. The brine flowing through the flume is cooled by refrigeration system to between 30 and 35 degrees Fahrenheit. The flume is sufficiently long so that cheese will be cooled to the desired temperature prior to packaging.

A drawback of the open flume system is that the cheese is not fully submerged and the upper surface, which is exposed to air, is not adequately cooled or salted. The exposed portion also dries out and becomes discolored if the block is not turned over periodically alone the flume. In addition hydraulic pressure tends to produce cupping of the top and bottom surfaces of the cheese blocks and bulging of the sides. Thus, workers must be positioned along the flume with tools to rotate the cheese blocks periodically to ensure uniform cooling and salting and to prevent deformation. This becomes very labor intensive.

A second cheese cooling system involves submerging the cheese in a large tank or pool of cooled brine. Typically the cheese blocks emerging from the molding machine are placed into baskets which are then mechanically lowered into the brine pool by an operator. This method ensures that all surfaces of the cheese are exposed to the brine and thus are cooled and salted uniformly. However, the submerging system still requires human operators to assist in filling and emptying the baskets of cheese and manual monitoring of the time that each basket has been in the brine to know when cooling is complete. In addition, the last cheese block to be placed into the basket usually is the first one taken out, thereby resulting is some blocks being in the brine longer than others, which produces blocks with different salt content and temperature.

Regardless of which conventional cooling method is used, a high level of manual labor and supervision is required. Therefore, it is desirable to provide a more automated and efficient process for uniformly cooling and salting cheese products.

SUMMARY OF THE INVENTION

The present invention is directed toward an apparatus to automatically ensure that freshly molded blocks of cheese are uniformly cooled and salted.

Such cheese cooling apparatus includes a tank having a cheese inlet and a cheese outlet. An inlet flume system is coupled to the cheese inlet and an outlet flume system is connected to the cheese outlet of the tank. A fluid circulation system produces a flow of liquid, such as water or brine, through the inlet flume, the tank and the outlet flume, whereby blocks of cheese are carried by that liquid flow.

The blocks of cheese are held in a carousel within the tank. That carousel includes a plurality of receptacles for the cheese blocks and a drive mechanism which moves each receptacle vertically through the tank to submerge the cheese. The drive mechanism sequentially aligns each receptacle with the cheese inlet to receive blocks of cheese from the inlet flume and selectively aligns each receptacle with the cheese outlet to enable cooled blocks of cheese to enter the outlet flume.

In the preferred embodiment of the cheese cooling apparatus, the tank is subdivided into a plurality of cooling cells that are fed with cheese blocks from a common inlet flume. A series of control gates, operated by an electronic controller, selectively direct cheese blocks from the inlet flume through the cheese inlet of a selected cooling cell. As the blocks of cheese enter the cooling cell, its carousel is indexed by the electronic controller so that the receptacles are filled with newly made cheese blocks. The fluid flow through the cooling cell also sequentially carries previously stored cheese blocks from the receptacles into the outlet flume and on to other processing equipment.

Another aspect of the present invention is a liquid circulation system that comprises flume and cooling circuits. The flume circuit produces a liquid flow that carries the blocks of cheese through the cooling apparatus. The cooling circuit has a liquid reservoir and a distribution conduit with a first pump and a heat exchanger connected in series between the liquid reservoir and the distribution conduit. A plurality of valves are operated by a controller to selectively apply liquid from the distribution conduit to a selected cooling cell. The cooling circuit also has a mechanism for transferring the liquid among the cooling cells in a daisy chain manner, whereby the chilled liquid preferably flows from the cell with the coldest cheese to the cell with the warmest cheese blocks. The liquid then flows from the cell with the warmest cheese back to the reservoir.

BRIEF DESCRIPTION OF THE DRAWINGS

FIG. 2 is a detailed view of a sensor that detects the presence of a cheese block at different locations within the cooling and salting apparatus;

FIG. 3 illustrates a gate that controls the flow of cheese blocks at different locations within the cooling and salting apparatus;

FIG. 4 is an enlarged section of FIG. 1 showing devices for directing the flow of cheese through the apparatus;

DETAILED DESCRIPTION OF THE INVENTION

Figure 1:
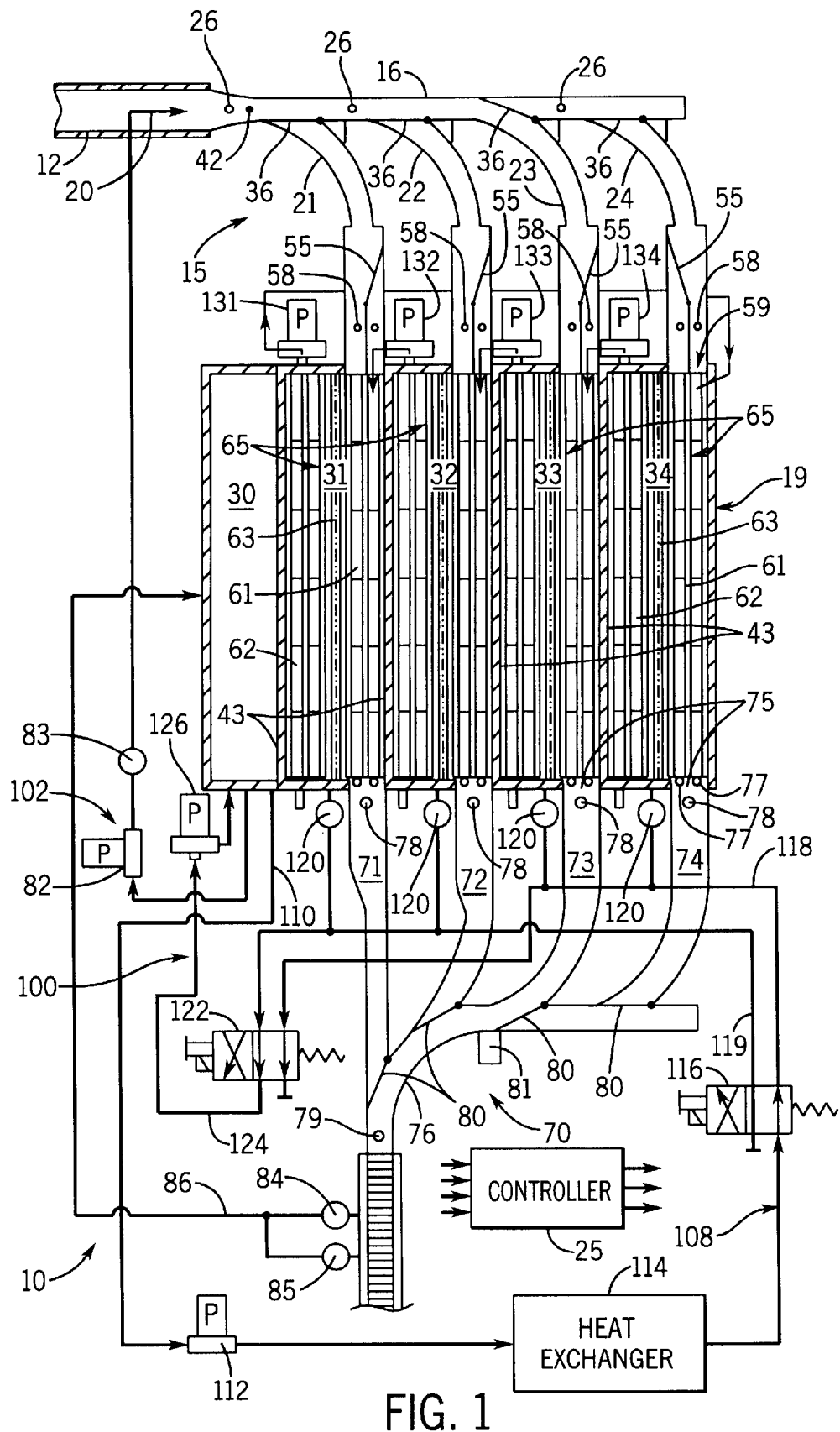
FIG. 1 is a schematic diagram of a cheese cooling and salting apparatus according to the present invention.

References herein to directional relationships and movement, such as left and right, refer to the relationship and operation of the apparatus in the orientation illustrated in the drawings, which may not be the operational orientation in every application of the present invention.

With initial reference to FIG. 1, an apparatus 10 for cooling and salting cheese is connected to the outlet 12 of a conventional cheese molding machine, such as one that produces blocks of mozzarella. Each cheese block emerging from outlet 12 enters an inlet flume system 15 formed by an inlet flume 16 and four side channels 21, 22, 23, and 24. The inlet flume 16 is a U-shaped, open channel having a width that is less than twice the width of a cheese block thus ensuring that the block travel in single file and will not wedge side-by-side blocking the flume. As will be described in greater detail, a variable speed pump creates a flow of brine through the inlet flume at a rate up to 300 gallons per minute in a direction indicated by arrow 20. The flow of brine propels floating blocks of cheese through the inlet flume 16 and the flow rate determines the speed of the cheese blocks.

A plurality of first sensors 26 are spaced along the inlet flume 16 to detect the presence of a cheese block at the respective locations. The first sensors 26 provide input signals to a microcomputer based controller 25 which governs the operation of the cheese cooling apparatus 10. FIG. 2 illustrates the details of one of the first sensors 26. The sensor 26 has a pivotally mounted rod 27 that extends downward into the inlet flume 16. A cross member 28 is mounted to pivot with the rod 27 and has an end that is adjacent a proximity sensor 29. The proximity sensor 29 is of a conventional design and emits a signal the indicates the presence or absence of the end of the cross member 28. A block of cheese floating past the sensor 29 moves the rod 27 upward as indicated by the rod drawn in phantom lines. When the rod pivots upward, the cross member 28 moves away from the proximity sensor 29 changing the signal from that device thereby indicating the presence of the cheese block. It should be understood that other types of devices for sensing the passage of cheese may be employed in the present system.

With reference again to FIG. 1, a movable stop 42 is located in the inlet flume 16 to control the flow of cheese from the outlet 12 of the molding machine. The details of the stop 42 are shown in FIG. 3. The stop 42 has a rod 44 that extends downward into the inlet flume 16 to prevent a cheese block from floating past the stop. The rod 44 is pivotally mounted above the inlet flume 16 and is connected to a lever 45 that is driven by a pneumatic or hydraulic cylinder 46. When the cylinder 46 rotates the lever 45 by 90 degrees, the rod 44 pivots out of the inlet flume 16 to allow cheese blocks to pass. When power is reversed to the cylinder 46 the stop rod 44 returns to the illustrated downward position.

Returning to FIG. 1, the warm cheese blocks travel down the inlet flume 16 toward a series of open U-shaped side channels 21, 22, 23 and 24. Each side channel 21-24 leads at an angle from the inlet flume 16 to the top of a separate cell of a cooling tank 19 and has separate inlet control gate 36 at the junction with the inlet flume 16. As shown in FIG. 4 for the third side channel 23, each inlet control gate 36 is connected to a first actuator 38, such as a pneumatic or hydraulic cylinder and piston, located above the inlet flume, which operates a linkage 40 connected to that control gate. The inlet control gate 36 is pivotally attached to a side wall of inlet flume 16 and moves in response to activation of the first actuator 38 by the microcomputer 25. As will be described, cheese blocks flow with the brine along the inlet flume 16 until reaching a side channel 21-24 with an control open gate 36, as is illustrated for third side channel 23. That open gate 36 directs the flow of brine and the cheese block into the side channel.

The cooling apparatus 10 can be utilized with large blocks of cheese which have a width approximately equal to the width of an entrance 59 into the cooling tank 19. Alternatively smaller blocks that are slightly less than one-half the entrance width can be processed. For this latter version, each side channel 21-24 has a secondary control gate 55 that is operated by a second actuator, such as pneumatic or hydraulic cylinder 57 mounted above the side channel. Beyond the secondary gate 57, the side channel 23 is divided in half longitudinally by a vertical wall 54. The secondary gate 57 directs the smaller cheese blocks into one side of the wall 54 and then into the other side, as will be described. A plurality of second sensors 58 are located between the secondary gates 57 and the entrance 59 of the cooling tank 31–34 and provide sensor signals to the controller 25. The second sensors 58 are of the same design as shown in FIG. 2 for the first sensors 26.

The cooling tank 19 in FIG. 1 is subdivided into four identical cooling cells 31, 32, 33, and 34 defined by walls 43 extending the full height and width of the cooling tank. Four cooling cells are shown for ease of illustration, with the understanding that additional cooling cells can be provided to increase the capacity of the cooling apparatus 10. The cooling tank 19 further includes a brine reservoir 30 which does not receive blocks of cheese. Each of the brine reservoir 30 and cooling cells 31–34 are separate water tight compartments of the cooling tank 19 and can be independently drained and filled with brine.

Figure 5:
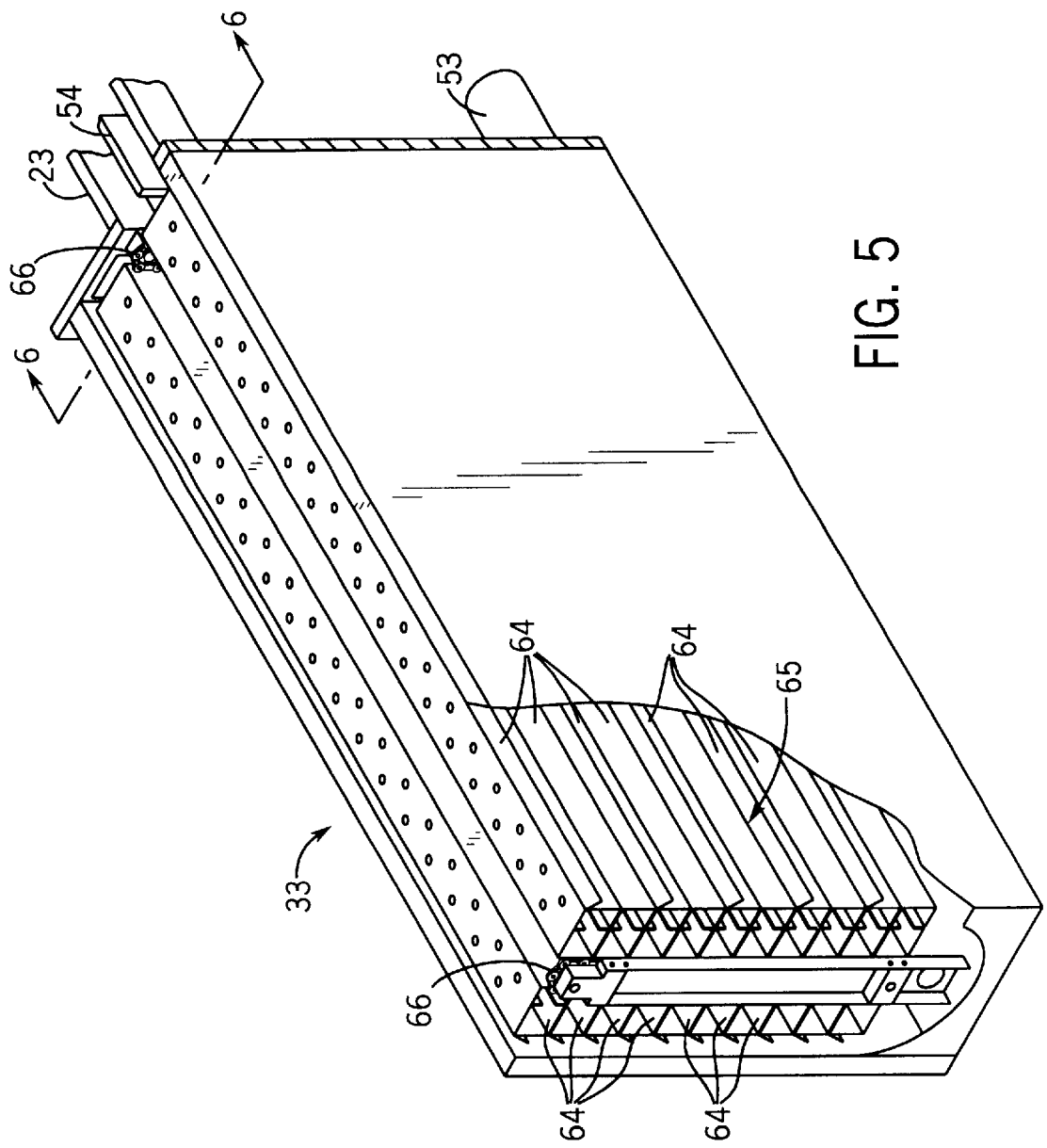
FIG. 5 is an isometric, partial cut-away view of one cooling cell of the present apparatus.
Figure 6:
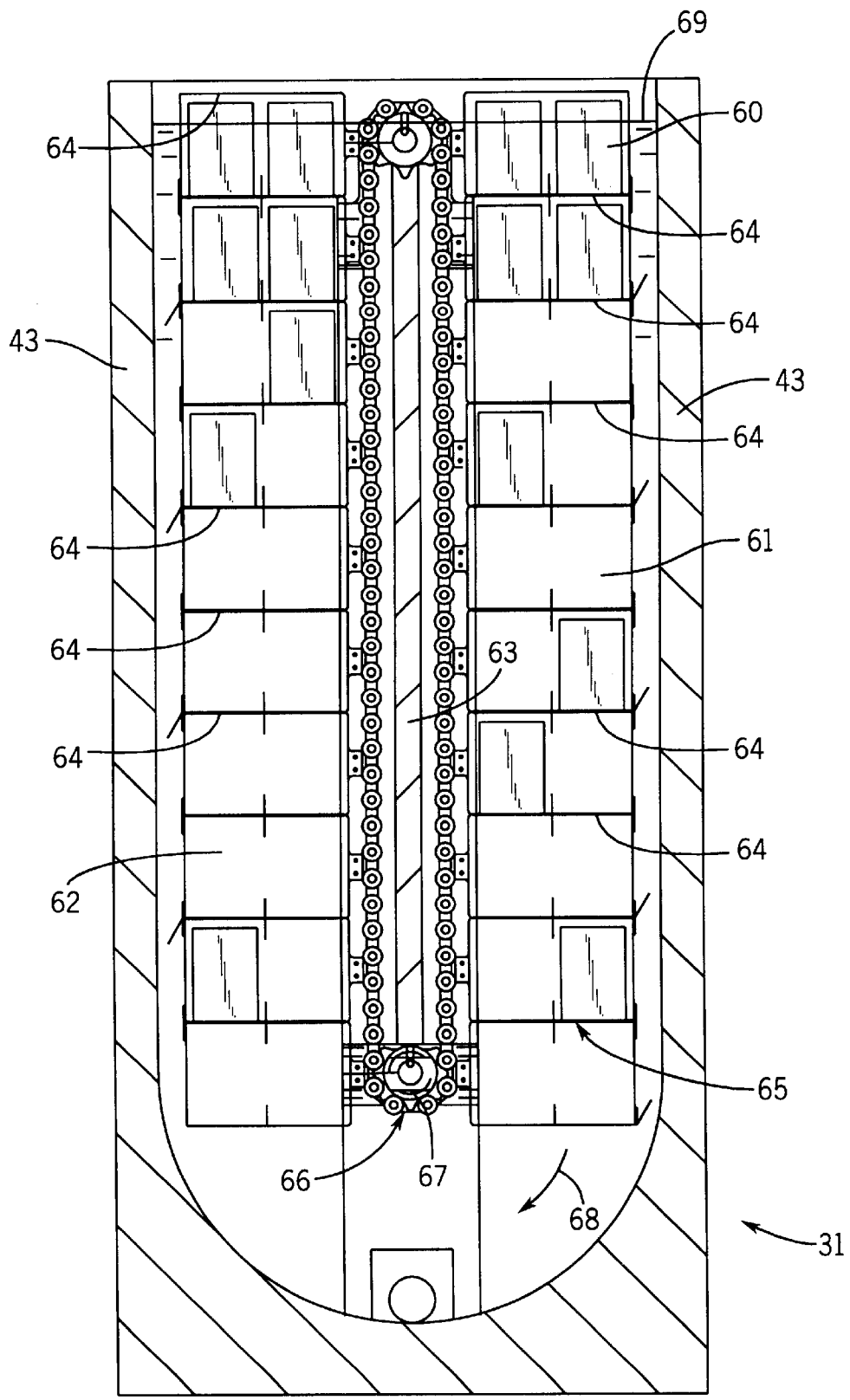
FIG. 6 is a cross-sectional end view along line 6—6 in FIG. 5.

Referring to FIGS 1, 5 and 6, each cooling cell 31–34 is divided lengthwise into two sections 61 and 62 by an internal wall 63 which extends across the length of the cooling cell. The cheese blocks flow into and out of the top of the first section 61. Within each cooling cell 31–24 is a carousel 65 having chains 66 on which are mounted elongated tubes 64 fabricated of perforated sheet metal or welded rods, thereby forming receptacles for the cheese blocks. For example, the carousel 65 can have twenty tubes 64 with ten tubes residing in each cooling cell section 61 and 62 at any given time. The tubes 64 rotate in a vertical loop through the cooling cell around the internal wall 63 when the chain 66 is driven by a motor 53 connected to the lower sprocket 67. Thus the chain 66, lower sprocket 67 and motor 53 form a drive mechanism for the carousel 65. As the chain rotates 65 in a clockwise direction indicated by arrow 68 in FIG. 6, the tubes 64 in the first section 61 move downward while the tubes move upward in the second section 62. The tubes 64 travel above and below the internal wall 63 between the two sections 61 and 62 of the cooling cell.

The cooling cells 31–34 are filled with brine to a level 69 that is slightly below the top of the upper most tubes 64. As will be described, this level allows the cheese blocks to float into and out of the tube at the top of the first section 61 in each cooling cell.

Referring specifically to FIG. 1, each cooling cell 31–34 has an exit opening 75 in a wall that is opposite to the wall having the entrance 59. A pair of exit stops 77 are located side by side in different halves of each exit opening 75 to control the movement of cheese blocks through that opening, as will be described. Each exit stop 77 has the same design as stop shown in FIG. 3.

Each exit opening 75 of the cooling tank 19 is connected to an outlet flume system 70 comprising a plurality of outlet channels 71, 72, 73 and 74 and an outlet flume 76. A trough shaped outlet channel 71, 72, 73 or 74 connects one of the cell exit openings 75 to the similarly shaped outlet flume 76. A separate outlet control gate 80 is located at the junction of each outlet channel 71–74 with the outlet flume 76 and has an actuator operated by controller 25. A plurality of third sensors 78 are located in each outlet channel 71–74 and a fourth sensor 79 is positioned in the outlet end of the outlet flume 76 to provide sensor signals to the controller 25. The outlet flume 76 leads to equipment (not shown) for packaging the cheese blocks. A fluid level sensor 81 provides a signal indicating the brine level in the outlet flume 76, which level corresponds to the height of brine in the cooling cell associated with an open exit gate 80 (e.g. third cooling cell 33). Alternatively, separate level sensors can be provided in each cooling cell 31–34 and in the reservoir 30.

The cheese cooling apparatus 10 includes a fluid circulation system 100 that comprises a flume circuit 102 and a cooling circuit 108 shown in FIG. 1. The flume circuit 102 creates a flow of brine that moves the blocks of cheese through the cooling apparatus 10. A first variable speed pump 82 draws brine from the reservoir 30 at a rate between zero and 300 gallons per minute. The speed of the first variable speed pump 82 and an electrically operated flow valve 83 in the flume circuit 102 are operated by the controller 25. The flow of brine from the first variable speed pump 82 is applied to the input flume adjacent the outlet 12 of the cheese molding machine, as indicated by arrow 20. This creates flow of brine at a high rate that carries the cheese blocks into the cooling tank 19.

The brine flows along inlet flume 16 until encountering an open inlet control gate 36, such as shown for the third side channel 23. At that location the brine is directed into the side channel and the associated cell (e.g. third cooling cell 33) of the cooling tank 19. This flow of brine exits this cooling cell 33 through exit opening 75 and an open outlet control gate 80 for the third outlet channel 73.

Additional electrically operated, proportional valves 84 and 85 control the flow of brine from the outlet flume 76 back to the reservoir 30 through return conduit 86 and provide the primary means of controlling the fluid levels in the system. The difference in the flow rate from the first variable speed pump 82 and that through these outlet valves 84 and 85 determines the rate of level change in the flume systems 15 and 70 and in the cooling cell 33 in which cheese is being exchanged. The pump rate is set for a desired flow velocity in the inlet flume 16. The outlet valves 84 and 85 are constantly being adjusted by a feedback control loop based on the fluid level measured by sensor 81. Accurate level control is required for proper movement of the cheese.

In addition to the flume circuit 102 that creates a fluid flow which moves the blocks of cheese, the fluid circulation system 100 includes a cooling circuit 108 which circulates refrigerated brine through the cooling tank 19. With continuing reference to FIG. 1, the cooling circuit 108 has a second variable speed pump 112 with an inlet connected to an outlet of the brine reservoir 30. The second variable speed pump 112 supplies brine at a flow rate of 50–100 gallons per minute to a conventional heat exchanger 114 of a refrigeration system, which reduces the temperature of the brine to 25–40 degrees Fahrenheit. The chilled brine from the heat exchanger 114 flows to a diverter valve 116 which directs the brine flow into either a first or a second distribution conduit 118 or 119, respectively. Half of the cooling cells 31–34 are connected to each distribution conduit 118 or 119. Specifically, the third and fourth cooling cells 33 and 34 are connected to the first distribution conduit 118 by separate control valves 120, which are electrically operated by the controller 25. The first and second cooling cells 31 and 32 are connected by similar electrically operated valves 120 to the second distribution conduit 119. As will be described, chilled brine is introduced to the bottom of one of the cooling cells 31–34 at any given time by selectively directing the flow of chilled brine from the heat exchanger 114 to one of the distribution conduits 118 or 119 and then opening the associated distribution valve 120 connected to the selected cell.

The two distribution conduits 118 and 119 also are connected to a drain control valve 122 which is electrically operated by the controller 25. The drain control valve 122 directs the brine from one of the distribution conduits 118 or 119 through a return line 124 to the input of a drain pump 126, that feeds into the brine reservoir 30. By selectively coupling one of the distribution conduits 118 or 119 to the drain pump 126 and opening the appropriate valve 120, the drain pump 126 can be used to empty brine from a cooling cell 31–34 that needs maintenance. In addition, as cheese is loaded into a previously empty cooling cell, the cheese blocks will displace brine which is removed from that cell and sent to the reservoir by the drain pump 126.

The cooling circuit 108 further includes a series of inter-cell pumps 131–134 which route brine between the cooling cells. The first inter-cell pump 131 transfers brine from the second section 62 of the first cooling cell 31 to an inlet of the fourth cooling cell 34 which is adjacent the cheese entrance 59. Similarly, the second inter-cell pump 132 feeds brine from the second cooling cell 32 to the cheese entrance area of the first cooling cell 31. The third inter-cell pump 133 transfers brine between the third and second cooling cells, and the fourth inter-cell pump 134 transfers brine between fourth and third cooling cells. Each intercell pump 131–134 introduces brine near the top of the first section 61 of a cooling cell 31–34 from which point the brine flows downward, under the internal cell wall 63 (FIG. 6) and upward in the second section 62 of the cooling cell from which the brine is drawn by another inter-cell pump. This path circulates the chilled through the entire cooling cell and produces uniform cooling of the cheese blocks.

The cheese to be cooled enters from the outlet 12 of the molding machine and the flow of brine in the flume circuit 102 carries the floating cheese through the cooling apparatus 10. This enables the cheese blocks to be loaded into and removed from the cooling tank 19 entirely without human intervention. Newly molded cheese blocks replace ones that have been stored in the cooling tank for the greatest amount of time. The controller 25 tracks the time that cheese has been stored in each tube 64 of the tank cooling cells 31–34.

A particular cooling cell (e.g. cell 33) is selected to receive the newly molded cheese blocks by the controller opening the inlet control gate 36 and the outlet control gate 80 associated with that cell. This action allows blocks of cheese to float with the brine flowing through the inlet flume system 15 into the selected cooling cell. When the cheese cooling apparatus 10 is started, the cooling cells are loaded with cheese beginning with the fourth cooling cell 34 and then going sequentially to the left in FIG. 1. At that time each cooling cell does not contain any cheese blocks that were previously being cooled. Therefore, the entering blocks of cheese displace a significant amount of brine in the cell. When fully loaded, the cheese blocks may occupy 28% of the cooling cell volume, for example. This means that the selected cell must be filled initially with a significantly greater amount of brine than required once fully loaded.

The present system enables this extra brine to be temporally borrowed from another cooling cell. For example, brine can be borrowed from the first cooling cell 31 to fill the third cooling cell 33. When the third cooling cell is being loaded for the first time, chilled brine from the heat exchanger 114 is being fed into the fourth cooling cell 34 from the first distribution conduit 118. At this time, the drain control valve 122 is operated to connect the second distribution conduit 119 to the drain pump 126. The valve 120 for the first cooling cell 31 is open to supply brine to the second distribution conduit 119 from which the brine is drawn by the drain pump 126 and sent to the reservoir 30. This replenishes brine that previously was drawn from the reservoir 30.

The brine drained from the first cooling cell 31 is supplied from the reservoir 30 to the selected third cooling cell 33 via the flume circuit 102 and the cooling circuit 108. The brine, that is displaced by blocks of cheese entering the third cooling cell 33, flows out through the outlet flume system 70 from which the brine is returned to the reservoir 30 via return conduit 86. By drawing brine from an cooling cell that does not contain cheese during start-up of the system 10, the size of the reservoir 30 can be reduced as it does not have to provide the entire volume of brine needed to charge the flume systems and initially overfill the cooling cells.

After all of the cooling cells have been filled with cheese, newly molded cheese replaces the cheese block that have been in the cooling system the longest. At that time, the cheese being replaced has been cooled to a temperature at which it can be handled by processing equipment downstream of the cooling system 10. Because the old cheese now is being exchanged with newly molded cheese, a significantly smaller volume of brine is being displaced as occurred during system start-up and the capacity of the reservoir 30 is sufficient to compensate for the minor fluctuations in the brine level.

To load freshly molded cheese blocks into the selected cooling cell, such as the third cell 33 as illustrated in FIG. 1, the carousel 65 sequentially aligns each of its tubes 64 with the entrance 59 and exit opening 75 of the cooling cell. Each time that another carousel tube 64 is indexed into this alignment, the top most position in the first section 61 of the selected cell, the stop 42 near the connection of the cheese molding machine to the cooling system prevents cheese blocks from entering the inlet flume 16.

The exit stop 77, for the half of the cell tube 64 that is selected by the secondary control gate 55, is opened to allow the flow of brine to carry previously stored cheese blocks from the topmost carousel tube 64 before newly molded blocks enter the other end of that tube. The exiting cheese blocks travel through the third outlet channel 73, past closed outlet control gates 80 in the outlet flume 76 for the other outlet channels 71–72 and on toward the packaging machine (not shown). While this movement of cheese blocks is occurring, the controller 25 is receiving signals from the third sensor 78 at the exit of the selected cooling cell 33. Thus the controller 25 is able to count the number of cheese blocks that float out of the cooling cell to determine when all of the blocks have exited. At that time, the controller 25 closes the exit stop 77 so that new cheese blocks will not travel through the tube and out the exit opening.

After a predefined interval of time, the controller 25 opens the stop 42 in the inlet flume 16 allowing the newly molded cheese blocks to flow into the cooling tank 19. The brine flow and the blocks of cheese are directed past the closed inlet control gates 36, which provide a water-tight closure of the opening of their respective side channels. The open inlet control gate 36 directs the brine flow and the blocks of cheese carried by that flow into and along the third side channel 23 until encountering its secondary gate 55. That secondary gate 55 directs the cheese blocks to one side or the other of vertical channel wall 54 (FIG. 4). The blocks continue to move through the entrance 59 of the associated cooling cell 33 and into one side of the topmost carousel tube 64 in the first cell section 61. The cheese blocks float on the surface of the brine in the cooling cell and move through the top most tube until reaching remote end where the first cheese block strikes the exit stop 77.

When one side of the topmost carousel tube 64 is full, the controller 25 activates the secondary gate 55 to fill the other side of the tube. When both sides of the topmost tube 64 have been filled with fresh blocks of cheese, the carousel 65 indexes to the next location so that the tube which previously was at the top of the second cell section 62 moves into the top position in the first section 61. The process of replacing the cooled cheese blocks with fresh blocks to be cooled then repeats for that tube and each of the other tubes until the third cooling cell 33 has been filled with new blocks of cheese. While the cheese blocks are cooling in each cell 31–34, the carousel 65 moves tubes 64 in a closed path through the brine in the tank to ensure that the cheese cools uniformly. The cheese in the top tubes should be submerged when cheese in its cooling cell is not being exchanges (i.e. its inlet and outlet control gates 36 and 80 are closed). When the outlet control gate 80 opens, the level of fluid in the associated cell should drop enabling the cheese blocks in the upper most tubes to float. A 300 gallon per minute flow from the inlet flume system 15 should drop the level one inch.

At that time, the inlet control gate 36 and the outlet control gate 80 for the third cooling cell 33 are closed by the controller 25. This causes the level of brine in the third cooling cell 33 to rise above the top of the upper most carousel tubes 64. The second cooling cell 32 then is selected by opening its inlet and outlet control gates. In this manner, the cheese blocks are loaded into each cooling cell 31–34 sequentially from left to right in FIG. 1. When the first cooling cell 31 has been loaded with new cheese blocks, the sequence selects the fourth cooling cell 34. As will be described, this loading sequence has an important relationship to the direction that refrigerated brine flows through the cooling tank 19.

Although the exemplary cheese cooling apparatus 10 has only four cooling cells for ease of illustration, it should be understood that additional cooling cells can be provided so that a given cheese block will remain in the cooling tank for a long enough period of time to cool sufficiently before having to be replaced with freshly molded cheese. For example, ten cooling cells as described may be required to allow continuous operation of a typical molding machine and provide sufficient cooling time.

Regardless of the number of cooling cells, the cooling circuit 108 produces a flow of chilled brine through the cooling tank 19 to cool the cheese blocks uniformly. The chilled brine from the heat exchanger 114 is introduced into the bottom of the cooling cell 31–34 which is closed-off from the flume systems 15 and 70 and which contains the cheese blocks that have been in the cooling tank 19 the greatest amount of time, i.e. the coldest cheese. That cooling cell usually is the one to the immediate left of the cell that is being loaded with warm, freshly molded cheese, except chilled brine is introduced into the fourth cooling cell 34 when the first cooling cell 31 is being loaded with cheese blocks. Thus, the coldest brine flows around the coldest cheese first and then is transferred to the cooling cell with the next coldest cheese, and so on until finally reaching the cooling cell having the warmest cheese, that has recently entered the cooling tank.

To accomplish this flow pattern in the exemplary apparatus in FIG. 1 where newly molded cheese is entering the third cooling cell 33, the controller 25 opens the distribution valve 120 associated with the second cooling cell 32 and closes all the other distribution valves. At this time, the third inter-cell pump 133, having an inlet connected to the third cooling cell 33, is turned off. Thus brine from the cell receiving hot, freshly molded cheese will not be fed to the adjacent cell with relatively cold cheese. The other inter-cell pumps 131–133 transfer the brine between cooling cells in a direction going toward cells with increasingly warmer cheese. This inter-cell brine flow ultimately reaches the cooling cell with the warmest cheese, i.e. the one presently be loaded with freshly molded cheese blocks (cooling cell 33 in the example). The brine then exits the cooling tank 19 through the cheese exit 75 of the third cell 33 and is returned to the reservoir 30 through the outlet flume 76, valves 84, 85 and conduit 86.

When the third cooling cell 33 becomes filled with newly molded cheese, the cheese blocks from the molding machine will be sent through the inlet flume system 15 into the second cooling cell 32. At that time, the distribution valve 120 associated with the second cooling cell 32 is closed and the distribution valve for the first cooling cell 31 is opened to introduce chilled brine from the heat exchanger 114 into that latter cell. The inter-cell pump 132 for the second cooling cell 32 now is turned off by the controller 25 and the intercell pump 133 for the third cooling cell 33 is activated. This switching of the brine flow path continues as loading and unloading cheese blocks sequences through the cooling cells 31–34 so that brine always flows in a direction from the coldest to the warmest cheese in the tank 19.

As stated previously, each carousel 65 periodically moves in a closed path around the internal cell wall 64 which results in more uniform cooling and minimization of cupping and bulging of the cheese blocks. As evident from FIG. 6, the carousel tubes 64 act as a paddle wheel forcing water over the outer wall 43 into the adjacent cooling cell to the left in FIG. 1. This movement of the carousels 65 also stirs the brine in each cooling cell 31–34 to minimize temperature gradients within the brine, and also flips the cheese blocks over in the cooling cells thereby producing uniformly shaped blocks.

The present cheese cooling apparatus 10 offers automated operation so that human intervention, required in previous cooling systems to guide and submerge the cheese blocks, is not needed. The counter flow of the cheese to the direction of the chilled brine flow increases cooling efficiency, that is the incoming refrigerated brine first contacts the coldest cheese, i.e. that which has been in the cooling system the greatest amount of time. This counter flow leads to a larger temperature difference being maintained throughout the system resulting in greater and more efficient heat transfer.

The dual distribution conduits 118 and 119 of the cooling circuit 108 enable brine to be drained from a given cooling cell 31–34 without affecting operation of the remaining cooling cells. When the chilled brine from the heat exchanger 114 is being supplied to a cooling cell connected to one distribution conduit 118 or 119, a cooling cell connected to the other conduit can be drained. That other distribution conduit is connected by outlet control valve 122 to the drain pump 126 and the distribution valve 120 for the cooling cell to be drained is opened. When the drain pump 126 is turned-on brine is drawn from the selected cooling cell and fed to the reservoir 30. The water-tight inlet and outlet control gates 36 and 80 prevent brine from the various flumes 16 and 76 from entering the cooling cell being drained. Note that additional connections than those illustrated have to be provided between the inter-cell pumps 131–134 to bypass the cooling cell being drained.

The foregoing description was primarily directed to a preferred embodiment of the invention. Although some attention was given to various alternatives within the scope of the invention, it is anticipated that one skilled in the art will likely realize additional alternatives that are now apparent from disclosure of embodiments of the invention. Accordingly, the scope of the invention should be determined from the following claims and not limited by the above disclosure.

What is claimed is:

1. An apparatus for cooling cheese blocks, said apparatus comprising:
   a tank for containing liquid and being divided into a plurality of cooling cells separated from each other by walls and with each cooling cell having a cheese inlet and a cheese outlet;
   a fluid circulation system connected to the tank and producing a flow of liquid through the cooling cells;
   a plurality of carousels with each one located in a different cooling cell, and each carousel having a plurality of receptacles for holding the cheese blocks and having a drive mechanism connected to the plurality of receptacles to submerge and move the cheese blocks through the liquid and flip over the cheese blocks;
   an inlet flume system connected to the cheese inlet of each of the plurality of cooling cells and having a control gate mechanism for selectively directing cheese blocks moving along inlet flume system into each of the plurality of cooling cells; and
   an outlet flume system connected to the cheese outlet of each of the plurality of cooling cells for receiving cheese blocks from the tank.

2. The apparatus as recited in claim 1, wherein the drive mechanism of each carousel moves the plurality of receptacles in a closed path through a respective cooling cell.

3. The apparatus as recited in claim 1, wherein the each of the plurality of receptacles has a tubular shape thereby forming a plurality of tubes; and the apparatus further comprising a controller operatively connected to the drive mechanism to sequentially align ends of the plurality of tubes with a cheese inlet, wherein cheese blocks entering the respective cooling cell are received into the plurality of tubes.

4. The apparatus as recited in claim 3, wherein the controller also operates the drive mechanism to sequentially align ends of the plurality of tubes with a cheese outlet to transfer cheese blocks from the plurality of tubes into the outlet flume system.

5. The apparatus as recited in claim 1, wherein the inlet flume system comprises an inlet flume, and a plurality of side channels extending from inlet flume to each cheese inlet of the plurality of cooling cells.

6. The apparatus as recited in claim 5, wherein the inlet flume system further comprises a movable gate at each junction of one of the plurality of side channels with the inlet flume, the movable gate for directing the cheese block from the inlet flume into the respective side channel.

7. The apparatus as recited in claim 1, wherein the outlet flume system comprises an outlet flume and a plurality of outlet channels each extending from one of the plurality of cooling cells to the outlet flume.

8. The apparatus as recited in claim 7, wherein the outlet flume system further comprises a movable gate at each junction of one of the plurality of outlet channels with the outlet flume, the movable gate for directing cheese blocks along the outlet flume.

9. The apparatus as recited in claim 1, wherein the fluid circulation system is connected to a fluid inlet of each cell to introduce the liquid into a selected one of the plurality of cooling cells and the fluid circulation system transfers the liquid from cooling cell to cooling cell in a predefined sequence.

10. The apparatus as recited in claim 9, wherein the fluid circulation system further comprises a plurality of inter-cell pumps each connected to the tank to transfer the liquid between the plurality of cooling cells.

11. The apparatus as recited in claim 9, wherein movement of the plurality of carousels cooperates with the fluid circulation system to transfer the liquid from cooling cell to cooling cell.

12. The apparatus as recited in claim 1, wherein the fluid circulation system is connected to a fluid inlet of each cell to introduce the liquid into a selected one of the plurality of cooling cells, and where movement of the plurality of carousels transfers the liquid from cooling cell to cooling cell in a predefined sequence.

13. The apparatus as recited in claim 1, wherein the fluid circulation system further comprises a cooling circuit having an inlet which receives the liquid and an outlet connected to the tank, the cooling circuit including a pump and a heat exchanger connected in series between the inlet and the outlet, wherein the heat exchanger cools the liquid flowing there through.

14. The apparatus as recited in claim 13, wherein the cooling circuit comprises a distribution conduit which receives liquid that has been cooled by the heat exchanger; and a plurality of valves connecting the distribution conduit to the plurality of cooling cells.

15. The apparatus as recited in claim 1, further comprising a retractable stop located in the inlet flume system for controlling movement of cheese blocks along the inlet flume system.

16. The apparatus as recited in claim 15, further comprising a plurality of retractable stops each located in the cheese outlet of one of the plurality of cooling cells for controlling movement of cheese blocks through the cheese outlet.

17. The apparatus as recited in claim 16, further comprising a controller connected to the retractable stop located in the inlet flume system and to the a plurality of retractable stops to control flow of cheese blocks into and out of the plurality of cooling cells.

18. The apparatus as recited in claim 17, further comprising sensor connected to the controller and located in at least one of the inlet flume system and the outlet flume system for detecting presence of a cheese block.

19. An apparatus for cooling cheese blocks, said apparatus comprising:
   a tank for containing liquid and being divided into a plurality of cooling cells separated from each other by walls, wherein each cooling cell has a cheese inlet, a cheese outlet and a fluid inlet;
   a plurality of carousels with each one located in a different cooling cell, and each carousel having a plurality of tubes for holding the cheese blocks and having a drive mechanism connected to the plurality of tubes to submerge and move the cheese blocks through the liquid;
   a fluid circulation system connected to the fluid inlet of each cell to introduce the liquid into a selected cell and the fluid circulation system transfers the liquid from cell to cell in a predefined sequence;
   a fluid circulation system is connected to each fluid inlet to introduce the liquid into a selected one of the plurality of cooling cells and the fluid circulation system transfers the liquid from cooling cell to cooling cell in a predefined sequence;
   an inlet flume system connected to each cheese inlet of the plurality of cooling cells and having a control mechanism for selectively directing cheese blocks moving along inlet flume system into each of the plurality of cooling cells; and
   an outlet flume system connected to each cheese outlet of the plurality of cooling cells for receiving cheese blocks from the tank.

20. The apparatus as recited in claim 19 wherein the drive mechanism sequentially aligns ends of the plurality of tubes with a cheese inlet and a cheese outlet to load and unload the plurality of tubes with cheese blocks.

21. The apparatus as recited in claim 19, wherein the fluid circulation system further comprises a cooling circuit having an inlet which receives the liquid and an outlet connected to the tank, the cooling circuit including a pump and a heat exchanger connected in series between the inlet and the outlet, wherein the heat exchanger cools the liquid flowing there through.

22. The apparatus as recited in claim 21, wherein the fluid circulation system further comprises a distribution conduit which receives liquid from the outlet of the cooling circuit, and has a plurality of valves each connecting the distribution conduit to a different one of the plurality of cooling cells.

23. The apparatus as recited in claim 22, further comprising a controller which selectively operates the plurality of valves.

24. The apparatus as recited in claim 19, wherein the fluid circulation system further comprises a plurality of inter-cell pumps each connected to the cooling tank to transfer the liquid between a pair of the plurality of cooling cells.

25. A method for cooling cheese blocks comprising:
   utilizing a flow of liquid to carry the cheese blocks along an inlet flume;
   sequentially diverting the flow of liquid from the inlet flume into each of a plurality of cooling cells, thereby directing the cheese blocks into the plurality of cooling cells;
   storing the cheese blocks in a carousel within each one of the of plurality of cooling cells;
   operating each carousel to submerge the cheese blocks in liquid within the plurality of cooling cells and flip over the cheese blocks; and
   after the cheese blocks in a given cooling cell have cooled a predefined amount, producing a flow of liquid which carries the cheese blocks out of the given cooling cell.

26. The method recited in claim 25, further comprising generating a flow of liquid through the plurality of cooling cells sequentially from one cooling cell to another cooling cell.

27. The method recited in claim 26, wherein each time the liquid is directed from one cooling cell to another cooling cell, the liquid leaves a cooling cell containing cheese that is colder than the cheese in a cooling cell that the liquid is entering.

28. The method recited in claim 25, further comprising introducing chilled liquid into a selected cooling cell; and transferring the liquid from the selected cooling cell through the remaining ones of the plurality of cooling cells in a predefined sequence.

29. An apparatus for cooling cheese blocks, said apparatus comprising:
- a tank for containing liquid and being divided into a plurality of cooling cells with each cooling cell having a cheese inlet and a cheese outlet;
- a plurality of carousels with each one located in a different cooling cell and having a plurality of tubes for holding the cheese blocks, the carousel further having a drive mechanism for moving the plurality of tubes within the cooling cell to submerge the cheese blocks in the liquid and flip over submerged cheese blocks;
- an inlet flume system connected to the cheese inlet of each of the plurality of cooling cells and having a control gate mechanism for directing cheese blocks moving along inlet flume system into a selected one of the plurality of cooling cells;
- a plurality of retractable stops each associated with a different cheese outlet to detain cheese blocks in an associated one of the plurality of cooling cells;
- an outlet flume system connected to the cheese outlet of each of the plurality of cooling cells for receiving cheese blocks from the tank; and
- a controller which operates the plurality of retractable stops, drive mechanisms of the plurality of carousels, and the gate mechanism.

30. The apparatus as recited in claim 29, further comprising a system for circulating the liquid through the tank sequentially from one cooling cell to another cooling cell.

31. The apparatus as recited in claim 30, wherein the system for circulating a liquid comprises a cooling circuit having a fluid inlet which receives liquid from the tank, a distribution conduit, a pump and a heat exchanger connected in series between the fluid inlet and the distribution conduit, and a plurality of valves operated by the controller to selectively enable flow of the liquid from distribution conduit to each of the plurality of cooling cells.

32. The apparatus as recited in claim 30, wherein the fluid circulation system is connected to a fluid inlet of each cell to introduce the liquid into a selected one of the plurality of cooling cells and the fluid circulation system transfers the liquid from cooling cell to cooling cell in a predefined sequence.

33. The apparatus as recited in claim 32, wherein the cooling circuit further comprises a plurality of inter-cell pumps each connected to the cooling tank to transfer the liquid from cooling cell to cooling cell.

34. The apparatus as recited in claim 29, further comprising a fluid circulation system connected to a fluid inlet of each cell to introduce the liquid into a selected one of the plurality of cooling cells, and wherein movement of the plurality of carousels transfers the liquid from cooling cell to cooling cell.

35. The apparatus as recited in claim 30, wherein the system for circulating a liquid comprises a flume circuit having a fluid inlet to receive liquid, a fluid outlet connected to direct the liquid into the inlet flume, and a pump connected between the fluid inlet and the fluid outlet.

36. The apparatus as recited in claim 29, further comprising another retractable stop in the inlet flume to detain cheese blocks therein.

\* \* \* \* \*